United States Patent [19]

Iddan

[11] Patent Number: 5,408,253
[45] Date of Patent: Apr. 18, 1995

[54] INTEGRATED GALVANOMETER SCANNING DEVICE

[75] Inventor: Gavriel J. Iddan, Rochester, N.Y.

[73] Assignee: Eastman Kodak Company, Rochester, N.Y.

[21] Appl. No.: 923,673

[22] Filed: Aug. 3, 1992

[51] Int. Cl.$^6$ .................................................. G10D 9/42
[52] U.S. Cl. ..................................... 347/260; 359/224; 359/230; 359/290; 359/291; 324/97; 346/107.3
[58] Field of Search ............... 359/224, 226, 230, 290, 359/291, 292, 846; 324/97; 346/109

[56] References Cited

U.S. PATENT DOCUMENTS

| | | | |
|---|---|---|---|
| Re. 16,818 | 12/1927 | Jenkins | 346/108 |
| 4,421,381 | 12/1983 | Ueda et al. | 350/6.6 |
| 4,560,925 | 12/1985 | Niven et al. | 324/97 |
| 4,790,639 | 12/1988 | Baumgarten et al. | 359/226 X |
| 5,010,353 | 4/1991 | Murahashi et al. | 346/108 |
| 5,078,479 | 1/1992 | Vuilleumier | 359/230 X |
| 5,154,247 | 10/1992 | Nishimura et al. | 177/211 |
| 5,170,283 | 12/1992 | O'Brien et al. | 359/291 |
| 5,172,262 | 12/1992 | Hornbeck | 359/230 X |
| 5,268,784 | 12/1993 | Chaya | 359/224 X |

FOREIGN PATENT DOCUMENTS 58-137818 8/1983 Japan.
1-86109 3/1989 Japan.

Primary Examiner—Benjamin R. Fuller
Assistant Examiner—Randy W. Gibson
Attorney, Agent, or Firm—Dennis R. Arndt

[57] ABSTRACT

An integrated galvanometer scanning device controllably deflects a beam of light. The device has a planar silicon wafer substrate with front and rear surfaces, first and second longitudinal slots extending from the front surface to the rear surface, and top and bottom grooves extending between the first and second longitudinal slots. The slots and grooves define a central portion of the wafer. A magnet is attached to the rear surface on the central portion of the wafer and a magnetic circuit is attached to the rear surface. A reflective surface is formed on the front surface on the central portion of the wafer. A strain gage on the wafer detects deflection of the reflective surface, and thus beam deflection. The components are integrated into the wafer or formed or mounted on the wafer forming an integrated unitary structure.

15 Claims, 2 Drawing Sheets

INTEGRATED GALVANOMETER SCANNING DEVICE

TECHNICAL FIELD OF THE INVENTION

The present invention relates generally to a scanning system, and, more particularly, to a galvanometer having a scanning mirror for controllably deflecting a beam of light.

1. Background of the Invention

In a reproduction system, such as a laser thermal printing system, a mirror is used to tilt or deflect a beam of light to achieve a desired printing result. Galvanometers have traditionally been used for deflecting beams of light. Older galvanometer designs are limited by low bandwidth or are complex and expensive to construct.

One of the demands placed on the galvanometer is that it be able to tilt the mirror very quickly to accomplish printing at a reasonable speed. The response speed of galvanometers has been hampered by the complexity of construction. Galvanometers typically have a mirror, a mechanism for tilting the mirror, a mechanism for determining the amount of tilt of the mirror, and a magnetic circuit for delivering information regarding how much tilting is desired. Understandably, it is desirable to have a galvanometer that can tilt the mirror very quickly and that is simple and relatively inexpensive to construct. It is also desirable to have a galvanometer that is compact in size, yet has a high bandwidth.

2. Summary of Invention

The present invention is directed to overcoming one or more of the problems set forth above. Briefly summarized, according to one aspect of the invention, an integrated galvanometer scanning device for controllably deflecting a beam of light, comprises a planar substrate having front and rear surfaces, first and second longitudinal slots extending from the front surface to the rear surface, and top and bottom grooves extending between the first and second longitudinal slots, with the slots and grooves defining a central portion of the substrate. A reflective surface is formed on the front surface on the central portion of the substrate. Deflection of the central portion of the substrate is detected. A magnet is attached to the rear surface on the central portion of the substrate, and a magnetic circuit is attached to the rear surface of the substrate.

Damping is provided to control undesired oscillation of the reflective surface. The damping is provided by an elastomeric material applied to the rear surface of the substrate, or by a sensor implanted in the substrate, having an output related to angular deflection of the reflective surface. A lead network receives feedback from the implanted position sensor.

A strain gage, a semiconductor or a photosensor detects deflection of the wafer. The strain gage is a resistive element attached to the front surface of the substrate. The strain gage can be deposited on, bonded to, or implanted in the flexed area.

The present invention integrates components and functions on a single silicon, or other similar wafer. The magnetic circuit is also attached to the wafer forming a compact unitary structure.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
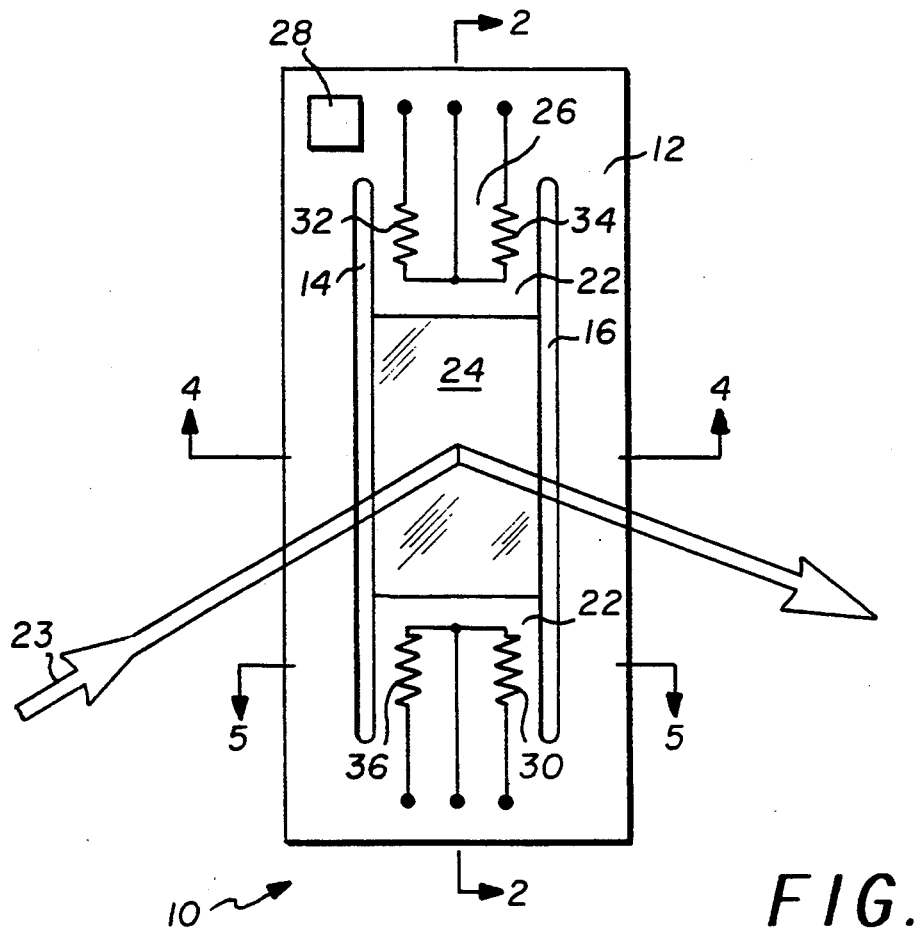
FIG. 1 is a diagrammatic front view of a preferred embodiment of a galvanometer wherein the components are mounted on a single silicon wafer.
Figure 2:
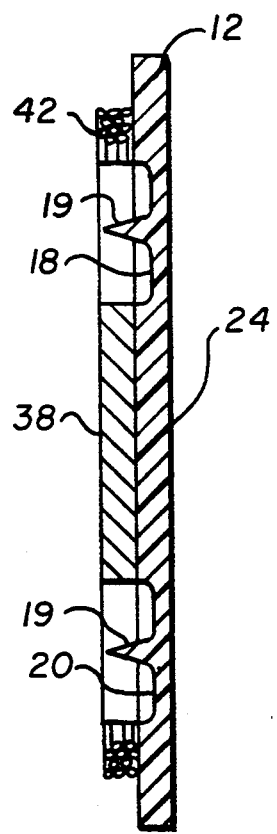
FIG. 2 is diagrammatic longitudinal sectional view of the wafer taken along line 2—2 of FIG. 1 illustrating the grooves therein to create a flexure.

Referring to FIGS. 1 and 2, a galvanometer scanner 10 is illustrated incorporating multiple components mounted on a single substrate 12. The substrate 12 is preferably a silicon wafer that has two longitudinal slots 14, 16 and top and bottom grooves 18, 20. The longitudinal slots 14, 16 and grooves 18, 20 define a generally central reflective portion 24 of the wafer 12. The grooves 18, 20 form pockets and are cut to a depth sufficient for portions 22 of the wafer to flex or move slightly and to move the central portion 24 with respect to the periphery of the wafer, but not so deep as to cause breakage or premature failure. A ridge or rib 19 may be left in the pockets to stiffen the flexure portion against bending in the plane parallel to the ridge. The grooves 18, 20 are shown positioned at the ends of the longitudinal slots 16, 18, but can be positioned at other locations along the slots as long as the central port,on 24 is able to deflect sufficiently to deflect a beam of light 23.

The central port,on 24 has a mirror mounted thereon, or may, simple be a polished surface for reflecting the light beam 23. The reflective surface 24 can also be formed by a totally reflective thin film formed on the central portion 24, which film may be selectively reflective to a selected wavelength region.

A position sensing device 26 is embedded in, deposited or bonded on the silicon wafer 12 in the relatively flexible portions 22 to detect the deflection of the central portion 24. The output of the position sensor 26 is delivered to an amplifier circuit 28 which is mounted on or embedded in the wafer 12. Alternatively, the amplifier circuit may be external of the wafer 12. The sensor device 26 is able to detect or measure the amount of deflection of the flexible portions 22 which indicates the deflection of the light beam 23.

A preferred way of measuring deflection of the flexible portions 22 is by using a strain gage which consists of a resistive element 30 positioned in the vicinity of one of the grooves, such as lower groove 20, to detect flexure in that vicinity. Preferably, the resistive element 30 extends across the groove to give the most accurate indication of movement. A second resistive element 32 may be positioned in the vicinity of the upper groove 18, as the first resistor 30 is positioned relative to the lower groove 20. Also, third and fourth resistive elements 34, 36 may be positioned on the front surface of the wafer 12. With the use of four resistors, flexure of the reflective surface 24 can be more accurately detected. The four resistors, when used are connected together to form a resistive bridge.

Figure 3:
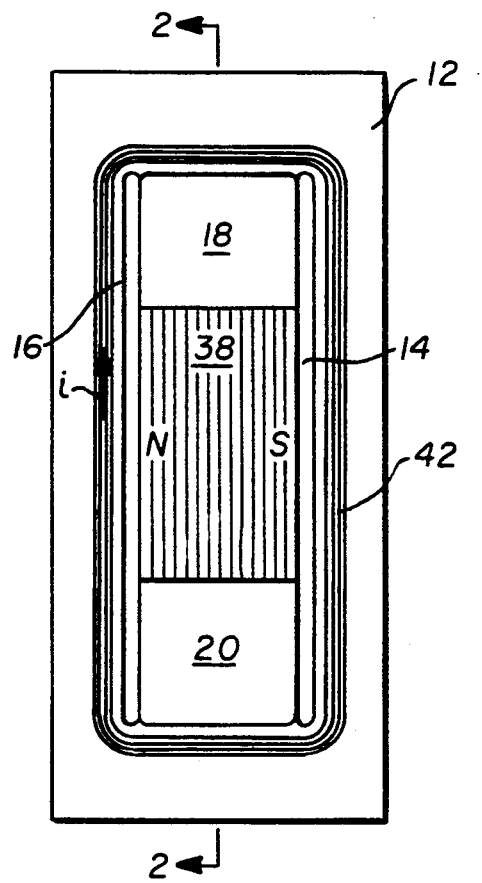
FIG. 3 is a rear view of the wafer of FIG. 1 illustrating the placement of the magnet.
Figure 4:
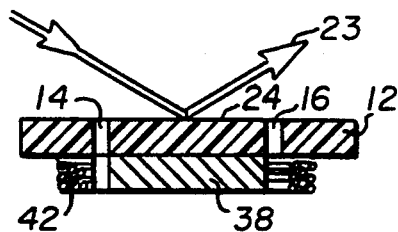
FIG. 4 is a horizontal sectional view of the wafer taken along line 4—4 of FIG. 1 illustrating the placement of the magnetic circuit.
Figure 5:
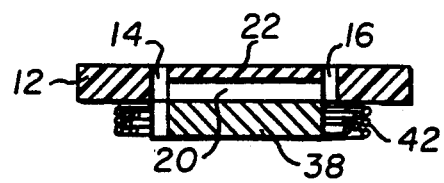
FIG. 5 is a cross-sectional view of the wafer taken along line 5—5 of FIG. 1.
Figure 6:
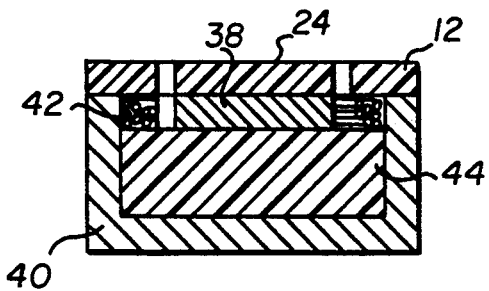
FIG. 6 is a cross-sectional view of an alternative embodiment also taken along line 4—4 of FIG. 1.

Referring to FIGS. 3 and 4, a magnet 38 is mounted on the rear surface of the wafer 12 and is preferably attached to the rear surface of the central portion 24, for example, with an epoxy resin or another bonding agent. As illustrated, the magnet 38 has a north pole oriented to the left and a south pole oriented to the right.

A magnetic circuit is attached to the rear of the wafer 12 and includes a coil 42. The coil 42 is connected to a drive circuit by means, not shown, which energizes the coil which generates a magnetic field that interacts with magnet 38 to cause the movement of the central portion 24.

An elastomeric compound 44 is attached to the rear surface of the wafer 12 and functions to dampen the vibration of the central portion 24. The elastomeric compound 44 may be selectively positioned on the central portion 24, or may be applied to cover a larger area of the rear surface of the wafer 12. The elastomeric material 44 may be positioned between the wafer 12 and the legs of the U-shaped magnetic core 40, and, when so positioned, will dampen vibration of the main portion of the wafer 12.

Operation

The magnetic circuit employs the coil 42 in cooperation with the flexure magnet 38 to flex the central portion of the wafer. For example, when the coil 42 is energized with a current i (FIG. 3), it repels the fixed north pole of the magnet 38 in one direction and pulls the south pole in the opposite direction causing the magnet 38 to twist around the axis coincident with section line 2—2, thus tilting the central portion 24 and the reflective surface thereon.

It will be appreciated that the silicon substrate 12 has, as an integral part, a sensor 26 capable of measuring the angular displacement of the reflective surface on the central portion 24. The sensor comprises a metallic film forming a strain gage on the flat front side of each of the grooves so that the bridge formed across the groove can sense the amount of twist of the wafer and central portion which is related to the angular deflection of the reflective surface. An alternative is to use an implanted semiconductor device, such as an FET, fabricated directly on the wafer whose output is directly related to the angular deflection of the reflective surface 24. With either sensing means, an amplifier or other processing circuitry can also be fabricated on the same silicon wafer or it can be separate from the wafer.

Because the more important applications of the silicon wafer galvanometer appear to be in compensating for broad band disturbances, a flat frequency response curve is desired, in contrast to other applications that operate at resonance. One method for eliminating the resonance of the galvanometer, thus yielding a flat frequency response, is to use the elastomeric compound 44 to passively dampen the frequency response. Another method for eliminating resonance is to use the feedback information from the embedded position sensor as input to a lead circuit as part of a closed loop operating mode. The closed loop mode eliminates resonance by adding active damping to yield the desired flat frequency response.

While the invention has been described with particular reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. For example, while the preferred embodiment is described with the magnet attached to the moving section with the magnetic circuit remaining stationary, it is also possible to attach the drive coil to the moving section and maintain the magnet stationary. The magnetic core 40 is preferably constructed of soft iron or other material having a high magnetic permeability. Preferably, the legs of the U are attached to the wafer 12 outboard of the longitudinal slots 14, 16 so that the magnetic circuit does not interfere with the flexure of the flexible portion 22.

It can also be appreciated that a device for tilting a mirror very quickly has been described wherein the mirror, the device for measuring the angle, and the magnets are all mounted on a single wafer, may also be used as a correction device for a polygon or for masking polygon errors.

As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

What is claimed is:

1. An integrated galvanometer scanning device for controllably deflecting a beam of light, comprising:

a planar single-piece substrate having a front surface and a rear surface, first and second longitudinal slots extending from said front surface to said rear surface, and top and bottom grooves extending between said first and second longitudinal slots, a central portion of said front surface of said substrate defined as being between the first and second longitudinal slots and relatively flexible portions overlying said grooves;

a reflective surface on said front surface of said central portion of said substrate; and a driving means for flexing the substrate comprising of one of the following; a magnet attached to the rear surface of said central portion of said substrate, and a magnetic circuit attached to the outer portion of said substrate.

2. A scanning device, according to claim 1, including the use of a magnetic core attached to the rear surface of the outer portion of said substrate.

3. A scanning device, according to claim 1, including means for detecting deflection of said flexible portions of said substrate.

4. A scanning device, according to claim 1, wherein said reflective surface is a coating on the central portion that is highly reflective to a selected wavelength region.

5. A scanning device, according to claim 1, including means for damping for controlling oscillation of said reflective surface.

6. A scanning device, according to claim 5, wherein said means for damping includes an elastomeric material applied to the rear surface of said flexible portion of said substrate.

7. A scanning device, according to claim 5, wherein said means for damping includes an elastomeric material applied to the rear surface of said substrate.

8. A scanning device, according to claim 2, wherein said means for damping includes an elastomeric material interposed between said magnet which is bonded to the central portion of the substrate and said magnetic core attached to the rear surface of said substrate.

9. A scanning device, according to claim 3, including a semiconductor implanted in said substrate and having an output related to angular deflection of said reflective surface.

10. A scanning device, according to claim 3, wherein said detecting means is a strain gage having a resistive element attached to one of said front surface and said rear surface and overlaying at least one of said grooves.

11. A scanning device, according to claim 3, wherein said detecting means is a strain gage having a first resistive element attached to one of the front surface and the rear surface and overlaying said top groove, and a second resistive element attached to a same surface as the first resistive element overlaying said bottom groove.

12. A scanning device, according to claim 11, including a third resistive element attached to one of the front surface and the rear surface outboard and adjacent said first slot, and a fourth resistive element attached to a same surface as the third resistive element outboard and adjacent said second slot, said first element, said second resistive element, said third resistive element; and said fourth resistive element forming a resistive bridge.

13. An integrated galvanometer scanning device for controllably deflecting a beam of light, comprising:
 a silicon wafer having a front surface and a rear surface, first and second longitudinal slots extending from said front surface to said rear surface, and top and bottom grooves extending between said first and second longitudinal slots, said slots and grooves defining an outer portion and a central portion of said wafer and relatively flexible portions overlying said grooves and connecting said outer portion and said central portion;
 a reflective surface on said front surface on said central portion of said wafer;
 means for detecting deflection of said flexible portion of said wafer;
 a magnet attached to said rear surface of said central portion of said wafer;
 a magnetic circuit attached to the outer portion of said rear surface of said wafer; and
 damping means for controlling oscillation of said reflective surface to thereby control deflection of said beam of light.

14. A scanning device, according to claim 13, wherein said deflection detecting means is a strain gage having a first resistive element attached to said front surface overlaying said top groove, a second resistive element attached to said front surface overlaying said bottom groove, a third resistive element attached to said front surface outboard and adjacent said first slot, and a fourth resistive element attached to said front surface outboard and adjacent said second slot, said first, second, third and fourth resistive elements forming a resistive bridge.

15. A scanning device according to claim 13 wherein a stiffening rib is provided in said top and bottom grooves which extend parallel to said grooves.

* * * * *